United States Patent [19]

Saito et al.

[11] Patent Number: 4,742,145

[45] Date of Patent: May 3, 1988

[54] METHOD FOR CURING ORGANOSILOXANE COMPOSITIONS

[75] Inventors: Masayuki Saito; Mitsuo Hamada, both of Chiba, Japan

[73] Assignee: Toray Silicone Co., Ltd., Tokyo, Japan

[21] Appl. No.: 11,467

[22] Filed: Feb. 5, 1987

[30] Foreign Application Priority Data

Mar. 5, 1986 [JP] Japan ................................. 61-48153

[51] Int. Cl.$^4$ ...................... C08G 77/12; C08G 77/20; C08L 83/05
[52] U.S. Cl. ........................................ 528/31; 528/32; 525/478; 524/588; 524/862
[58] Field of Search .................... 528/31, 32; 525/478; 524/588, 861, 862

[56] References Cited

U.S. PATENT DOCUMENTS 4,335,035 6/1982 Hatanaka ............................... 528/31

OTHER PUBLICATIONS

Walter Noll, Chemistry and Technology of Silicones, 1968, pp. 49–55.

*Primary Examiner*—John C. Bleutge
*Assistant Examiner*—David Buttner
*Attorney, Agent, or Firm*—Robert Spector

[57] ABSTRACT

A cured silicone rubber is produced by heating at a temperature of at least 150 degrees C. under a pressure of at least 9.8 kilopascals gauge pressure a silicone rubber composition comprising an alkenyl-containing organopolysiloxane, an organohydrogenpolysiloxane and finely divided silica in the absence of a hydrosilation catalyst or organoperoxide.

4 Claims, No Drawings

METHOD FOR CURING ORGANOSILOXANE COMPOSITIONS

BACKGROUND OF THE INVENTION

1. Field of the Invention

The present invention relates to a method for curing organosiloxane compositions to form a silicone rubber. More specifically, the present invention relates to a novel method for curing organosiloxane compositions which use an organohydrogenpolysiloxane as the curing agent in the absence of a curing catalyst or an organoperoxide.

2. Description of the Prior Art

Known methods for curing organosiloxane to form a silicone rubber include (1) the condensation of silanol substituted organopolysiloxanes with organosilicon compounds having a plurality of hydrolyzable groups, for example. alkoxysilanes, acetoxysilanes or aminoxysilanes; (2) the free radical initiated polymerization of diorganopolysiloxanes in the presence of organoperoxides; and (3) a hydrosilylation reaction between compounds containing silicon-bonded hydrogen atoms and organopolysiloxanes containing ethylenically unsaturated hydrocarbon radicals, for example, silicon-bonded vinyl radicals, in the presence of a platinum catalyst.

The necessity for using platinum metal or a platinum compound to catalyze curing of organpolysiloxanes by a hydrosilation reaction is taught in the literature, including a text entitled "Chemistry and Technology of Silicones" by Walter Noll, published as an English translation in 1968 by Academic Press, New York: and an article entitled "Silicone Elastomer Developments 1967-1977" by E. L. Warrick et al. [Rubber Chemistry and Technology, 52 (3), 1979].

Recently disclosed methods for curing organosiloxane compositions include curing by means of ultraviolet irradiation; curing by means of high-frequency radiation, infrared radiation or electron beams and the polymerization of mercapto substituted diorganopolysiloxanes in the presence of organoperoxides. Of these known methods, curing in the presence of organoperoxides and curing via a platinum catalyzed hydrosilylation reaction are the ones most generally used. Curing of organosiloxane compositions using organoperoxides suffers from the problem of organoperoxide decomposition residues remaining in the cured product, with the result that the product requires post-vulcanization to remove or inactivate these residues.

The disadvantages associated with curing by a hydrosilation reaction are poor storage stability and short use time of the curable organosiloxane composition.

To avoid these problems, the present inventors examined various methods for curing organosiloxane compositions with the objective of providing a novel method for curing these compositions without the need for a curing catalyst or an organoperoxide.

SUMMARY OF THE INVENTION

The present invention is based on the discovery that a cured silicone rubber can be produced by heating under superatmospheric pressure an organosiloxane composition comprising an alkenyl-containing organopolysiloxane, an organohydrogenpolysiloxane and finely divided silica in the absence of a hydrosilation catalyst.

DETAILED DESCRIPTION OF THE INVENTION

The present invention provides a method for curing an organosiloxane composition, said method consisting essentially of heating said composition at a temperature of at least 150° C. and under a gauge pressure of at least 9.8 kilopascals for a sufficient time to cure said composition, where said composition comprises (A) 100 parts by weight of an organopolysiloxane with the average unit formula $R_aSiO_{(4-a)/2}$ where R represents an unsubstituted or substituted monovalent hydrocarbon radical where the substituent is at least one member selected from the group consisting of halogen atoms and the cyano group the average value of a is from 0.8 to 2.2. and said organopolysiloxane contains at least 2 lower alkenyl radicals in each molecule, (B) an organohydrogenpolysiloxane having at least 2 silicon-bonded hydrogen atoms in each molecule in an amount sufficient to provide at least 1 mole of silicon-bonded hydrogen atoms per 1 mole of alkenyl radicals in ingredient (A), and (C) 5 to 200 parts by weight of finely divided silica, and where said composition does not contain a hydrosilation catalyst or an organoperoxide.

The characterizing features of the present method include the presence of finely divided silica and the absence of a hydrosilation catalyst or organoperoxide for promoting curing of the organosiloxane composition. The composition is cured by heating it under superatmospheric pressure.

By way of explanation, with regard to the organopolysiloxane comprising ingredient A, R in the aforementioned formula represents a monovalent hydrocarbon radical or a substituted monovalent hydrocarbon radical wherein at least a portion of the carbon atoms contain at least one halogen atom or cyano group as substituents. The R radicals can be identical or different and can be alkyl such as methyl, ethyl and propyl; alkenyl such as vinyl and allyl; aryl such as phenyl and tolyl; cycloalkyl such as cyclohexyl; or any of these radicals in which at least a portion of the hydrogen atoms have been replaced by halogen or cyano, for example, chloromethyl, trifluoropropyl and cyanomethyl. At least 2 of the R radicals in each molecule must be alkenyl.

The organopolysiloxane referred to herein as ingredient A can be linear or branched. At least 50 mol % of the R radicals are preferably methyl. The terminal groups of ingredient A are not specifically restricted, and can be silanol groups, alkoxy groups and triorganosiloxy groups such as trimethylsiloxy, dimethylphenylsiloxy, dimethylvinylsiloxy and/or methylphenylvinylsiloxy. The average value of the number represented by a is from 0.8 to 2.2 and preferably from 1.95 to 2.05.

The organohydrogenpolysiloxane referred to herein as ingredient B of the present compositions is the crosslinker for curing the composition. The molecular configuration of this ingredient can be straight chain, cyclic or branched chain. This ingredient must contain at least 2, preferably at least 3, silicon bonded hydrogen atoms in each molecule. The degree of polymerization (DP) of this ingredient must be at least 2 and is preferably 3 or greater.

The molar ratio of silicon-bonded hydrogen atoms in ingredient B relative to alkenyl radicals in ingredient A is preferably in the range of 5:1 to 50:1 in order to achieve a satisfactory cure. The amount of ingredient B is generally from 1 to 10 parts by weight per 100 parts by weight of ingredient A.

The finely divided silica, referred to herein as ingredient C, is essential to achieve crosslinking of ingredient A by reaction with ingredient B in the absence of a platinum-containing catalyst. In the absence of this finely divided silica, the curing reaction does not occur under the conditions of the present method.

Ingredient C is exemplified by precipitated silica, which can be produced by wet methods, and fumed silica, which can be produced by dry methods. Ingredient C is present within the range of from 5 to 200 parts by weight, preferably from 10 to 100 parts by weight, per 100 parts by weight of ingredient A. Failure to observe this range is undesirable because curing will be unsatisfactory at silica concentrations below 5 parts by weight, while the workability of the composition will be reduced at silica concentrations of above 200 parts by weight.

In accordance with the present method, a mixture comprising ingredients A, B, and C is heated at a temperature of at least 150° C. under superatmospheric pressure. This pressure is preferably at least 9.8 kilopascals (kPa) gauge pressure, and most preferably at least 98 kPa. It appears that the curing reaction will not proceed at pressures below 9.8 kPa.

Curing of the present composition will occur at 150° C., however a temperature of at least 180° C. is preferred, with temperatures within the range of from 200° to 250° C. being most preferred.

In addition to the aforementioned ingredients A, B, and C, additional ingredients, including finely divided quartz powder, diatomaceous earth, zinc white, aluminum silicate, iron oxide, cerium oxide, titanium hydroxide, asbestos, glass fiber, pigments and heat stabilizers can be blended into the present compositions as desired unless this adversely affects the objectives of the present invention.

In accordance with the present invention, a composition comprising specified quantities of lower alkenyl-containing organopolysiloxane, an organohydrogenpolysiloxane and finely divided silica is cured by heating it at a temperature of at least 150° C. under a gauge pressure of at least 9.8 kilopascals. The present method eliminates the requirement for and disadvantages associated with a hydrosilation catalyst or an organoperoxide.

The following examples describe preferred embodiments of the present invention, and should not be interpreted as limiting the scope of the invention as defined in the accompanying claims. All parts and percentages in the examples and comparison examples are by weight unless otherwise specified, all pressure values are gauge pressure, and viscosity values are measured at 25° C.

EXAMPLE 1

An organosiloxane composition of this invention was prepared by mixing to homogeniety 100 parts of a dimethylvinylsiloxy-terminated organopolysiloxane gum containing an average of 3000 repeating units per molecule, 0.5 weight % vinyl radicals, 99.8 mol % dimethylsiloxane units, and 0.2 mol % methylvinylsiloxane units; 45 parts wet-process precipitated silica (Nipsil LP from Nippon Silica Co., Ltd.) and 5 parts of a trimethylsiloxy-terminated methylhydrogenpolysiloxane having a viscosity of $2\times10^{-5} m^2/sec$ and a silicon bonded hydrogen atom content of 1.0 wt %. This composition was placed in a metal mold and then heated at 200° C. under a pressure of 2.45 megapascals for 10 minutes. After cooling the metal mold, the organosiloxane composition was demolded and found to be cured.

The physical properties of this cured silicone rubber product were measured in accordance with Japanese Industrial Standards (JIS) test procedure K-6301. The product exhibited a hardness (JIS A) of 54, a tensile strength of 8.6 megapascals and an elongation at break of 480%.

For purposes of comparison. the same organosiloxane composition was placed in the metal mold and heated at 200° C. in the absence of superatmospheric pressure for 10 minutes. cooled and demolded. In this instance the organosiloxane composition was not cured.

EXAMPLE 2

100 Parts of the organopolysiloxane gum described in the preceding Example 1 was mixed to homogeneity with 50 parts dry-process silica (Aerosil 300 from Nippon Aerosil Co., Ltd) and 5 parts of the methylhydrogenpolysiloxane described in the preceding Example 1 to obtain an organosiloxane composition of this invention. This composition was placed in a metal mold and heated at 200° C. under a pressure of 2.45 megapascals for 10 minutes. After the metal mold had cooled, the composition was demolded and found to be a cured silicone rubber. The physical properties of this cured product are measured in accordance with JIS K-6301. The rubber exhibited a hardness value (JIS A) of 38, a tensile strength of 0.78 megapascals and an elongation at break of 600%.

For purposes of comparison. the same organosiloxane composition was placed in the metal mold. heated at 200° C. under atmospheric pressure for 10 minutes. cooled and then demolded. In this instance the organosiloxane composition was not cured.

EXAMPLE 3

An organosiloxane composition prepared as described in the preceding Example 1 was placed in a metal mold and then heated at 160° C. under a pressure of 9.8 megapascals for 10 minutes. After cooling the metal mold, the organosiloxane composition was demolded and found to be a cured silicone rubber. The hardness of this cured product was 50, measured in accordance with test procedure JIS A.

That which is claimed is:

1. A method for curing an organosiloxane composition, said method consisting essentially of (1) heating said composition at a temperature of at least 150° C. and under a gauge pressure of at least 9.8 kilopascals for a period of time sufficient to cure said composition, where said composition comprises
   (A) 100 parts by weight of an organopolysiloxane with the average unit formula $R_aSiO_{(4-a)/2}$ where R represents an unsubstituted or substituted monovalent hydrocarbon radical where the substituent is at least one member selected from the group consisting of halogen atoms and the cyano group, the average value of a is from 0.8 to 2.2, and said organopolysiloxane contains at least 2 lower alkenyl radicals in each molecule,
   (B) an organohydrogenpolysiloxane having at least 2 silicon-bonded hydrogen atoms in each molecule in an amount sufficient to provide at least 1 mole of silicon-bonded hydrogen atoms per 1 mole of alkenyl radicals in ingredient (A), and
   (C) 5 to 200 parts by weight of finely divided silica, and where said composition does not contain a hydrosilation catalyst or an oroganoperoxide.

2. A method according to claim 1 where each R is individually selected from the group consisting of methyl, propyl, vinyl, allyl, phenyl, tolyl, cyclohexyl, chloromethyl, trifluoropropyl and cyanomethyl, and the degree of polymerization of the organohydrogenpolysiloxane is at least 3.

3. A method according to claim 2 where at least 50% of the R radicals are methyl, the organopolysiloxane is a diorganopolysiloxane, the terminal units of said diorganopolysiloxane are dimethylvinylsiloxy units and the curing temperature of said composition is at least 180 degrees C.

4. A method according to claim 3 where said diorganopolysiloxane is a dimethylsiloxane/methylvinylsiloxane copolymer, said silica is a wet process precipitated silica and is present at a concentration of from 10 to 100 parts by weight per 100 parts by weight of said copolymer, and the composition is cured at a temperature of from 200 to 250 degrees C. under a gauge pressure of at least 98 kPa.

* * * * *